(12) United States Patent
Nakao et al.

(10) Patent No.: US 7,407,205 B2
(45) Date of Patent: Aug. 5, 2008

(54) MOULD END CAP

(75) Inventors: Makoto Nakao, Chiryu (JP); Kazunori Kondoh, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/662,382

(22) PCT Filed: Oct. 1, 2004

(86) PCT No.: PCT/JP2004/014974

§ 371 (c)(1),
(2), (4) Date: Mar. 9, 2007

(87) PCT Pub. No.: WO2006/038307

PCT Pub. Date: Apr. 13, 2006

(65) Prior Publication Data

US 2007/0278830 A1    Dec. 6, 2007

(51) Int. Cl.
*B60R 19/42*    (2006.01)

(52) U.S. Cl. .................................. 293/128

(58) Field of Classification Search ............... 293/128; 296/203.01, 146.1, 152; 52/716.5, 716.6, 52/717.01; 49/502
See application file for complete search history.

(56) References Cited

U.S. PATENT DOCUMENTS

| | | | | |
|---|---|---|---|---|
| 4,066,285 A | * | 1/1978 | Hall et al. | 293/128 |
| 4,334,706 A | * | 6/1982 | Seki | 293/126 |
| 4,498,697 A | * | 2/1985 | McGlone et al. | 293/128 |
| 4,617,209 A | * | 10/1986 | Ives | 293/128 |
| 4,629,232 A | * | 12/1986 | Zimlich et al. | 293/128 |
| 4,662,671 A | * | 5/1987 | Davis | 296/217 |
| 4,726,614 A | * | 2/1988 | Myers et al. | 293/128 |
| 4,948,637 A | * | 8/1990 | Kessler | 293/128 |
| 4,969,674 A | * | 11/1990 | Wagner | 293/128 |

(Continued)

FOREIGN PATENT DOCUMENTS

JP    5-082694 U    11/1993

(Continued)

OTHER PUBLICATIONS

International Search Report dated Feb. 8, 2005.

(Continued)

*Primary Examiner*—Kiran B. Patel
(74) *Attorney, Agent, or Firm*—Buchanan Ingersoll & Rooney PC

(57) ABSTRACT

A mould end cap comprises a cap end portion engaged with an end of a mould body for a vehicle frame, a mould insert portion extending from the cap end portion and inserted in the mould body, and a hook portion provided at the mould insert portion and engaged with the mould body. In the mould end cap, the hook portion comprises a first step portion having a quadrangular column shape, which has a front surface and a rear surface inclined and opposite to each other, and side surfaces each having a trapezoidal shape, and a second step portion located on an upper end of the first step portion, the second step portion having a quadrangular column or pyramid shape, which has an inclined front surface, a vertical rear surface, and side surfaces each having a trapezoidal or triangular shape.

4 Claims, 6 Drawing Sheets

U.S. PATENT DOCUMENTS

| | | | |
|---|---|---|---|
| 4,978,490 A * | 12/1990 | Jackson | 264/148 |
| 5,037,148 A * | 8/1991 | Kennedy | 293/128 |
| 5,096,753 A * | 3/1992 | McCue et al. | 293/128 |
| 5,330,805 A * | 7/1994 | Shirahata | 293/128 |
| 5,350,608 A * | 9/1994 | Zoller | 293/128 |
| 5,641,547 A * | 6/1997 | Dilley | 264/138 |
| 5,879,037 A * | 3/1999 | Batiste | 293/128 |
| 6,213,186 B1 * | 4/2001 | Torres et al. | 296/37.16 |
| 6,318,045 B1 * | 11/2001 | Kress | 52/716.6 |
| 7,055,291 B2 * | 6/2006 | Nakanishi et al. | 52/716.5 |
| 7,210,730 B2 * | 5/2007 | Fujita et al. | 296/146.5 |
| 2007/0278827 A1 * | 12/2007 | Nakao et al. | 296/191 |

FOREIGN PATENT DOCUMENTS

| | | |
|---|---|---|
| JP | 11-034757 A | 2/1999 |
| JP | 2004-249745 A | 9/2004 |

OTHER PUBLICATIONS

Written Opinion of the International Searching Authority.
Form PCT/ISA/237 (International Preliminary Report on Patentability) dated Apr. 11, 2007, English version only.

* cited by examiner

Fig. 6
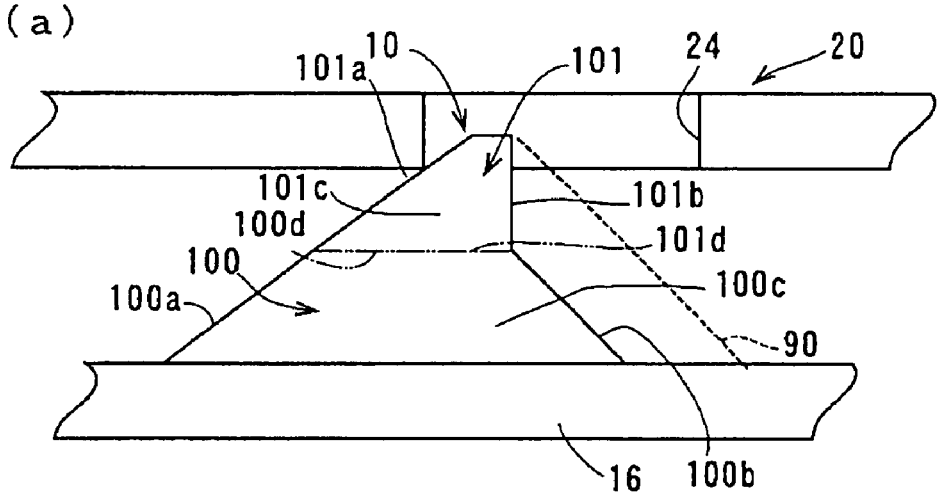
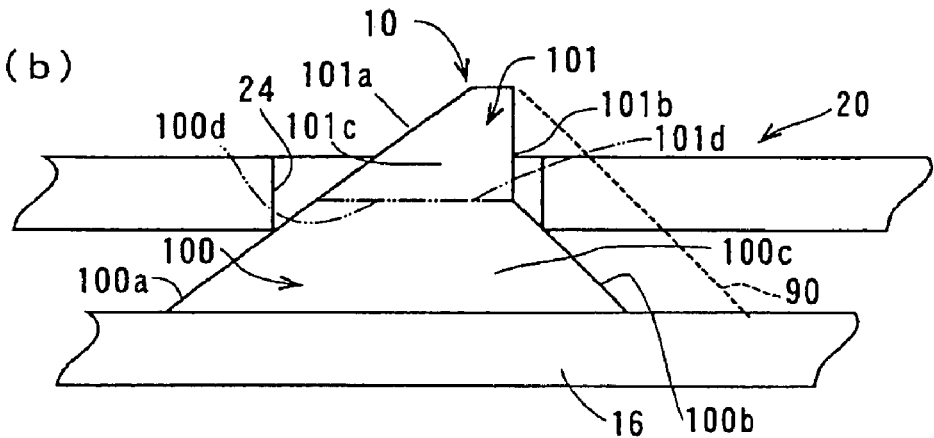
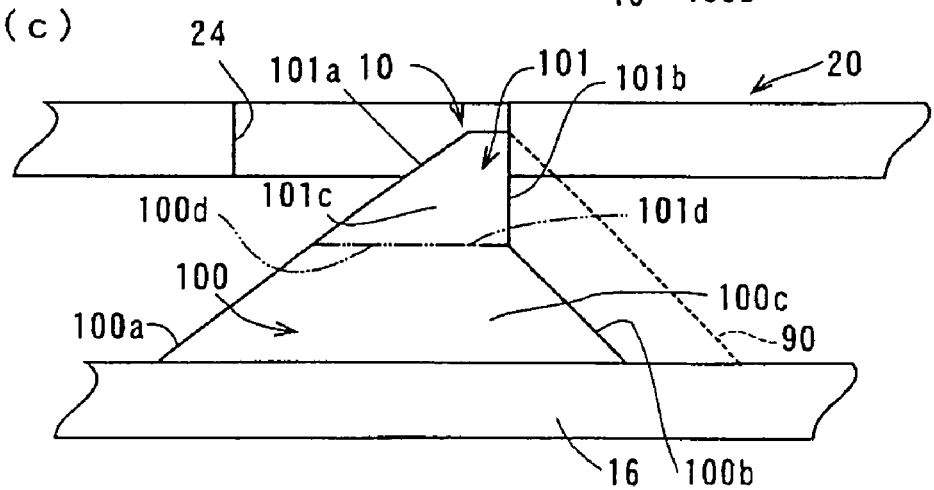

MOULD END CAP

TECHNICAL FIELD

The present invention relates to a mould end cap to be attached to an end of a mould body.

BACKGROUND ART

Conventional mould end caps are described in Japanese Laid Open Utility Model No. 5-82694 (cited reference 1) and Japanese Laid Open Patent No. 11-34757 (cited reference 2). Such a mould end cap includes a cap end portion engaged with an end of a mould body for a vehicle frame, a mould insert portion inserted in the mould body, and a hook portion engaged with the mould body.

Cited reference 1 discloses a bonding film made from PVC resin, which is coated on an inner surface of the mould body to which the mould end cap is attached. The hook portion is bonded to the bonding film.

Further, Cited reference 2 discloses a notch portion formed at the mould body, so that the hook portion of a mould end cap is engaged with the notch portion.

Therefore, when the mould insert portion is inserted in the mould body, the hook portion may be bonded to the bonding film of the mould body or engaged with the notch portion, so that the mould end cap can be assembled with the mould body.

DISCLOSURE OF INVENTION

However, in the conventional mould end cap disclosed in cited reference 1 as described above, the hook portion may sway due to the elasticity of the bonding film coated on the inner surface of the mould body. Further, in the conventional mould end cap disclosed in cited reference 2 as described above, because the notch portion is formed at the mould body, a secure engagement between the hook portion and the notch portion may be disturbed when any deviation in the location or size of the notch portion occurs. As a result, a gap may be generated between the end of the mould body and the mould end cap, thereby degrading a desirable appearance when the mould end cap has been assembled with the mould body.

Accordingly, the present invention has been made to solve the above-mentioned limitations occurring in the related art. The present invention provides a mould end cap, which can prevent generation of a gap between the mould end cap and a mould body assembled with each other and attain an intended design.

The present invention provides the configuration capable of automatically correcting error in positions of assembly between the mould end cap and the mould body.

That is, in first aspect, the present invention provides a mould end cap as defined in claim 1 comprising: a cap end portion assembled with an end of a mould body for a vehicle frame; a mould insert portion extending from the cap end portion and inserted in the mould body; and a hook portion provided at the mould insert portion and engaged with the mould body, wherein the hook portion comprises: a first step portion having a quadrangular column shape, which has a front surface and a rear surface inclined and opposite to each other, and side surfaces each having a trapezoidal shape; and a second step portion located on an upper end of the first step portion, the second step portion having a quadrangular column or pyramid shape, which has an inclined front surface, a vertical rear surface, and side surfaces each having a trapezoidal or triangular shape.

As used herein, the front surface of the first step portion and the second step portion refers to a surface oriented toward the mould body, and the rear surface of the first step portion and the second step portion refers to a surface oriented toward the cap end portion. The front surface and the rear surface of the first step portion may be inclined either at the same angle or different angles.

Further, in second aspect of a mould end cap according to the present invention provides a mould end cap as defined in claim 2, the front surface of the first step portion and the second step portion compose a single continuous surface.

The upper surface of the first step portion may be the same as the lower surface of the second step portion. Also, the side surfaces of the first step portion and the second step portion may compose a single continuous surface.

Further, in third aspect of a mould end cap according to the present invention provides a mould end cap as defined in claim 3, the mould insert portion includes a leaf spring portion extending in an insertion direction toward the mould body, and the hook portion is formed at the leaf spring portion.

Further, in forth aspect, the present invention provides a mould end cap as defined in claim 4 further comprising an engagement part extending in a direction perpendicular to the insertion direction toward the mould body and engaged with the vehicle frame, wherein the engagement part is located near the hook portion.

The configuration in which the engagement part is located near the hook portion implies that the engagement part is located, for example, either before or behind the hook portion in the insertion direction toward the mould body.

According to the first aspect of the present invention provides a mould end cap as defined in claim 1, the mould insert portion of the mould end cap can be easily inserted in the mould body for the vehicle frame, because the front surfaces of the first and second step portion in the hook portion form an inclined surface. Then, the front and rear surfaces of the first step portion and the front and rear surfaces of the second step portion in the hook portion are engaged with the notch portion, so that the mould end cap is assembled with the mould body. Even when a slight error occurs at the position at which the mould body and the mould end cap are assembled, at least one of the inclined front and rear surfaces of the first step portion and the inclined front surface and the vertical rear surface of the second step portion is engaged with the mould body without fail. By the engagement between at least one surface and the mould body as described above, it is possible to attach the mould end cap to the mould body at a portion between those surfaces and the cap end portion. Thus, it is possible to automatically correct an error that may occur at the position at which the mould body and the mould end cap are assembled. By such an automatic correction for the assembling position, it is possible to prevent a gap from being easily generated between the cap end portion of the mould end cap and the end portion of the mould body, thereby improving a desirable appearance in the state in which the mould end cap is assembled with the mould body.

Therefore, the mould end cap according to the present invention can prevent generation of a gap between the mould end cap and the mould body assembled with each other, and attain an intended design.

Further, according to a second aspect of the present invention provides a mould end cap as defined in claim 2, because the front surface of the first step portion and the front surface of the second step portion in the hook portion of the mould end cap compose a single continuous surface, the mould insert portion of the mould end cap can be easily inserted in the mould body.

Further, according to a third aspect of the present invention provides a mould end cap as defined in claim 3, because the hook portion is formed at a leaf spring portion extending in an insertion direction toward the mould body, the hook portion can be pushed outward to the mould body by the elastic force of the leaf spring portion. By this, the hook portion of the mould end cap can be easily engaged with the mould body.

Further, according to a forth aspect of the present invention provides a mould end cap as defined in claim 4, because the mould end cap further comprises an engagement part extending in a direction perpendicular to the insertion direction toward the mould body and engaged with the vehicle frame, it is possible to engage the mould body having the mould end cap attached thereto to the vehicle frame. Thus, it is possible to prevent the mould body with the mould end cap from being separated from the vehicle frame. Further, because the engagement part is located near the hook portion, it is possible to reduce the entire length of the mould end cap. As a result, it is possible to reduce the manufacturing cost of the mould end cap.

BRIEF DESCRIPTION OF THE DRAWINGS

FIGS. 6A to 6C are enlarged side views of a hook portion and a notch portion according to an embodiment of the present invention.

BEST MODE FOR CARRYING OUT THE INVENTION

Various embodiments of the present invention will now be described in detail with reference to the accompanying drawings.

Figure 1:
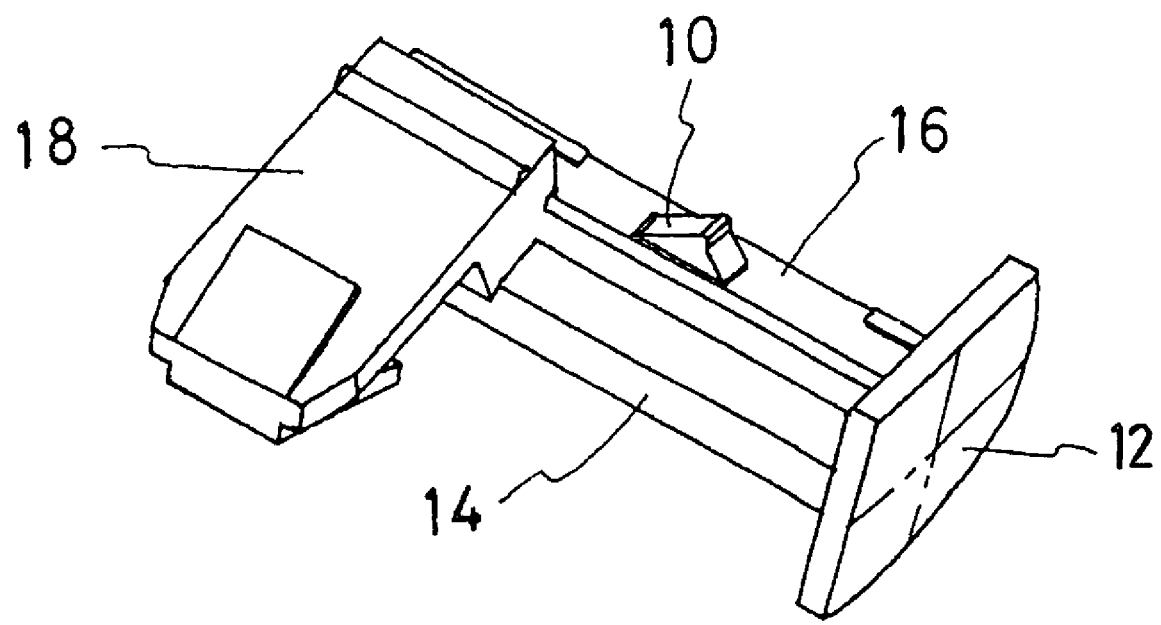
FIG. 1 is a perspective view of a mould end cap according to an embodiment of the present invention.
Figure 2:
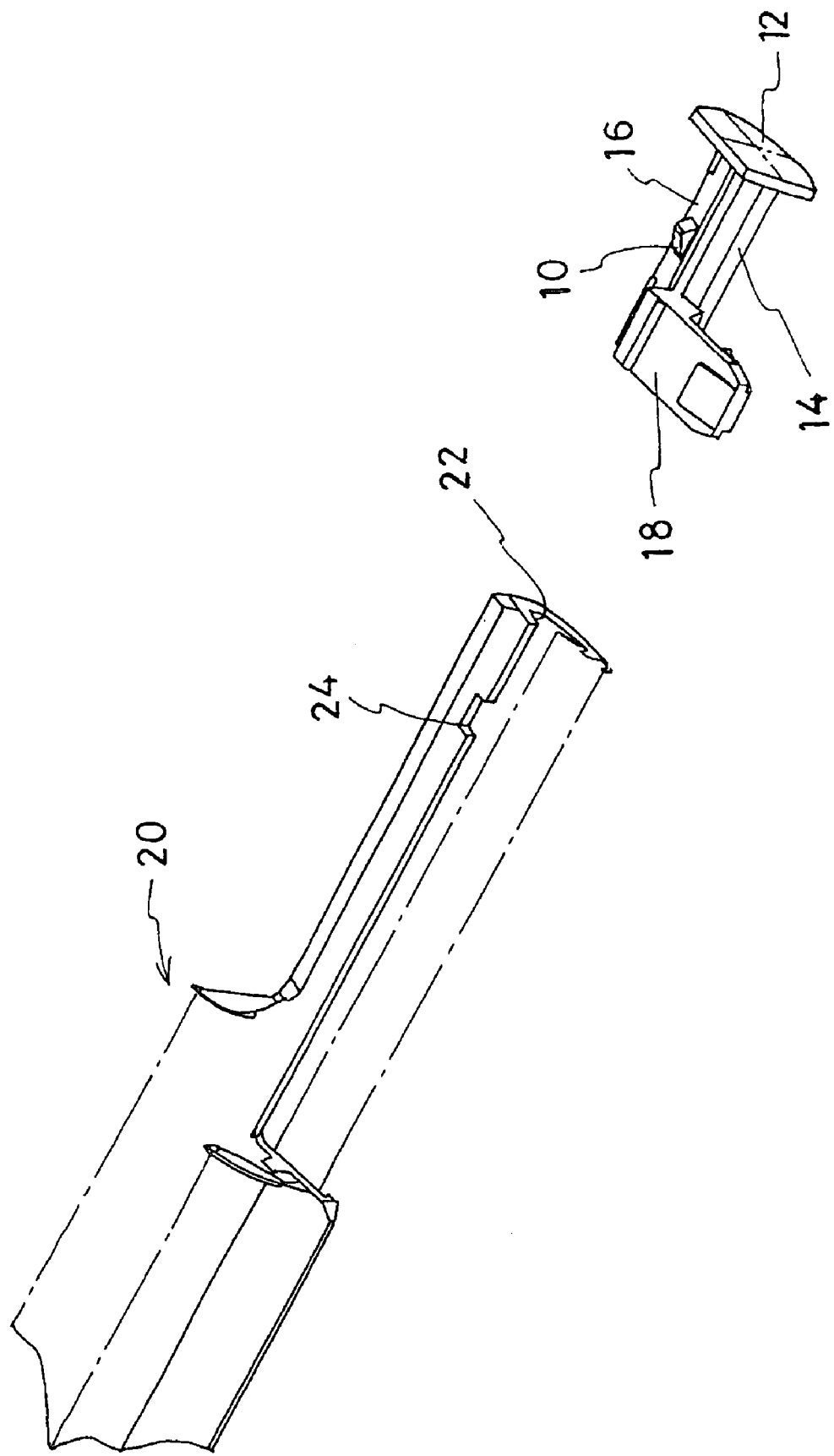
FIG. 2 is an exploded perspective view of a mould body and a mould end cap according to an embodiment of the present invention.

As shown in FIG. 1, a mould end cap according to an embodiment of the present invention is made from polyester resin and includes a cap end portion 12 having a large diameter and a mould insert portion 14 extending from the cap end portion 12. A leaf spring portion 16 extends in parallel with the mould insert portion 14 and a hook portion 10 protrudes convexly from a central portion of the leaf spring portion 16. An engagement part 18 substantially having a shape of letter "V" is formed across the ends of the mould insert portion 14 and the leaf spring portion 16 and extends in a direction perpendicular to the direction in which the mould insert portion 14 and the leaf spring portion 16 extend. Further, the mould insert portion 14 and the leaf spring portion 16 extend toward an opening end 22 of a mould body 20 as shown in FIG. 2. As used herein, the direction from the mould end cap toward the opening end 22 of the mould body 20 is referred to as an "insertion direction." Further, the insertion direction is referred to as "forward" (the front side), while its reverse direction is referred to as "backward" (the rear side).

Figure 3:
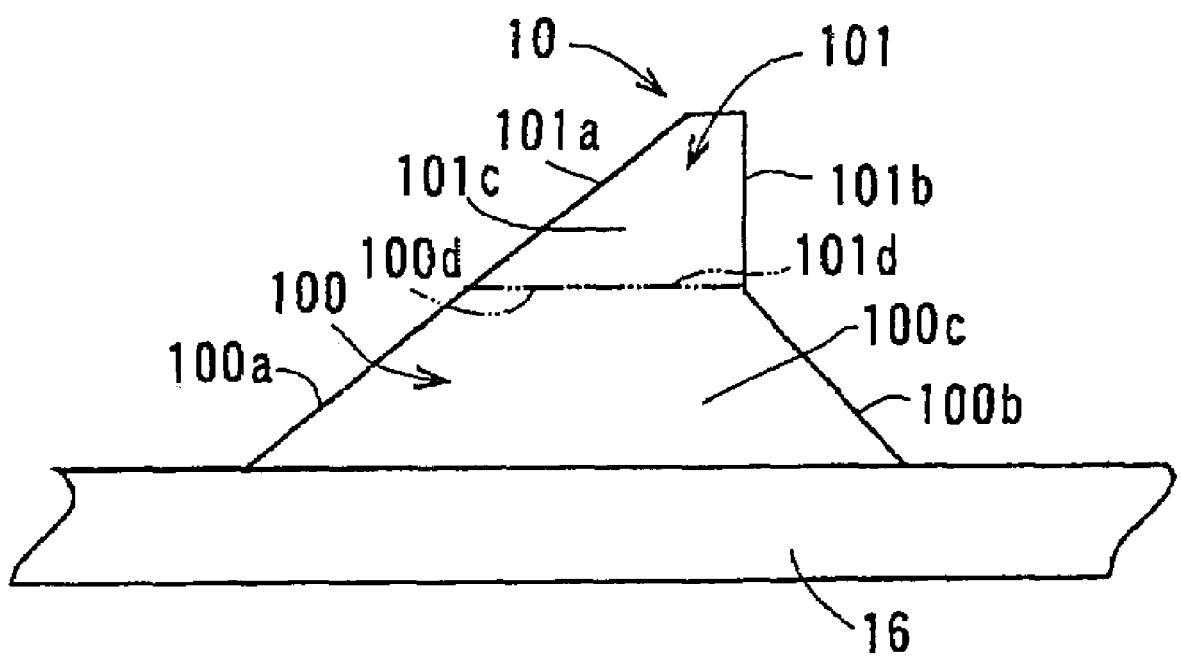
FIG. 3 is an enlarged side view of a hook portion according to an embodiment of the present invention.

Especially, as shown in FIG. 3, the hook portion 10 of the mould end cap has a first step portion 100 formed on the leaf spring portion 16, and a second portion 101 is formed on the first step portion 100. The first step portion 100 has a front surface 100a and a rear surface 100b, which are inclined and are opposite to each other. The front surface 100a and the rear surface 100b of the first step portion 100 may be inclined either at the same angle or at different angles. As a result, the first step portion 100 has a quadrangular column shape having a trapezoidal side surface 100c. Further, the second step portion 101 on the first step portion 100 has an inclined front surface 101a, which is continuous to and in line with the front surface of 100a of the first step portion 100, so that the front surface 100a of the first step portion 100 and the front surface 101a of the second step portion 101 together compose a same single surface. Further, the second step portion 101 has a vertical rear surface 101b connected to the rear surface 100b of the first step portion 100. Therefore, the second step portion 101 has a quadrangular column shape having a trapezoidal side surface 101c. Also, the second step portion 101 may have a quadrangular pyramid shape having a triangular side surface 101c. Further, the upper surface 100d of the first step portion 100 is the same as the lower surface 101d of the second step portion 101.

The mould end cap configured as described above is inserted in the mould body 20 as shown in FIG. 2. The mould body 20 has an opening end 22 substantially having a shape of letter "⊐" into which the mould insert portion 14 of the mould end cap is inserted, and a notch portion 24 spaced a predetermined distance in the insertion direction of the mould insert portion 14 from the opening end 22.

Figure 4:
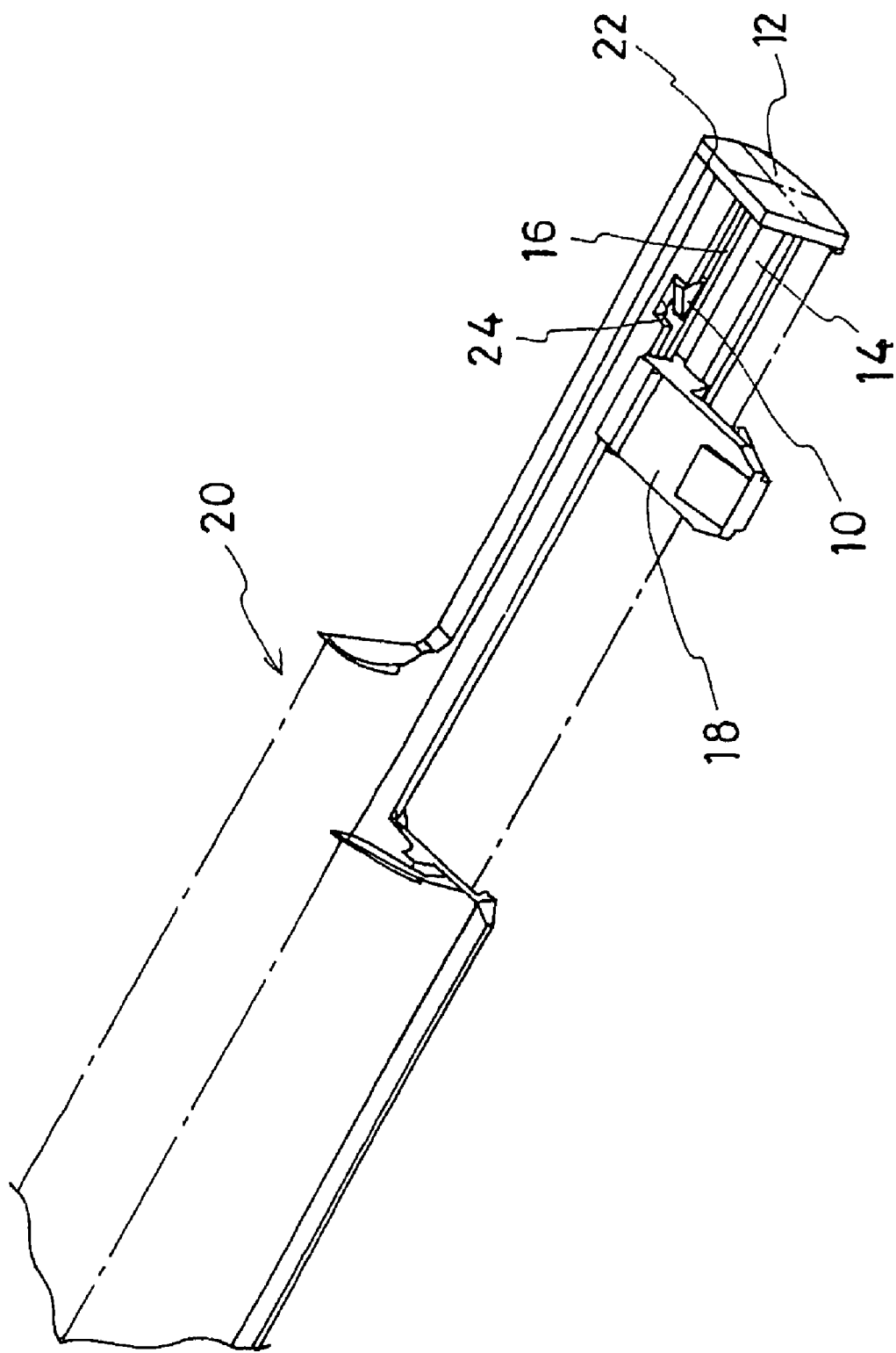
FIG. 4 is a perspective view of a mould body and a mould end cap assembled with each other according to an embodiment of the present invention.

Therefore, as shown in FIG. 4, the mould insert portion 14 of the mould end cap is inserted in the opening end 22 of the mould body 20. Then, because the hook portion 10 includes the first step portion 100 and the second step portion 101, the mould insert portion 14 of the mould end cap can be inserted in the mould body 20 in an easy and smooth manner due to the front surfaces 100a and 101a of the first step portion 100 and the second step portion 101.

Figure 5:
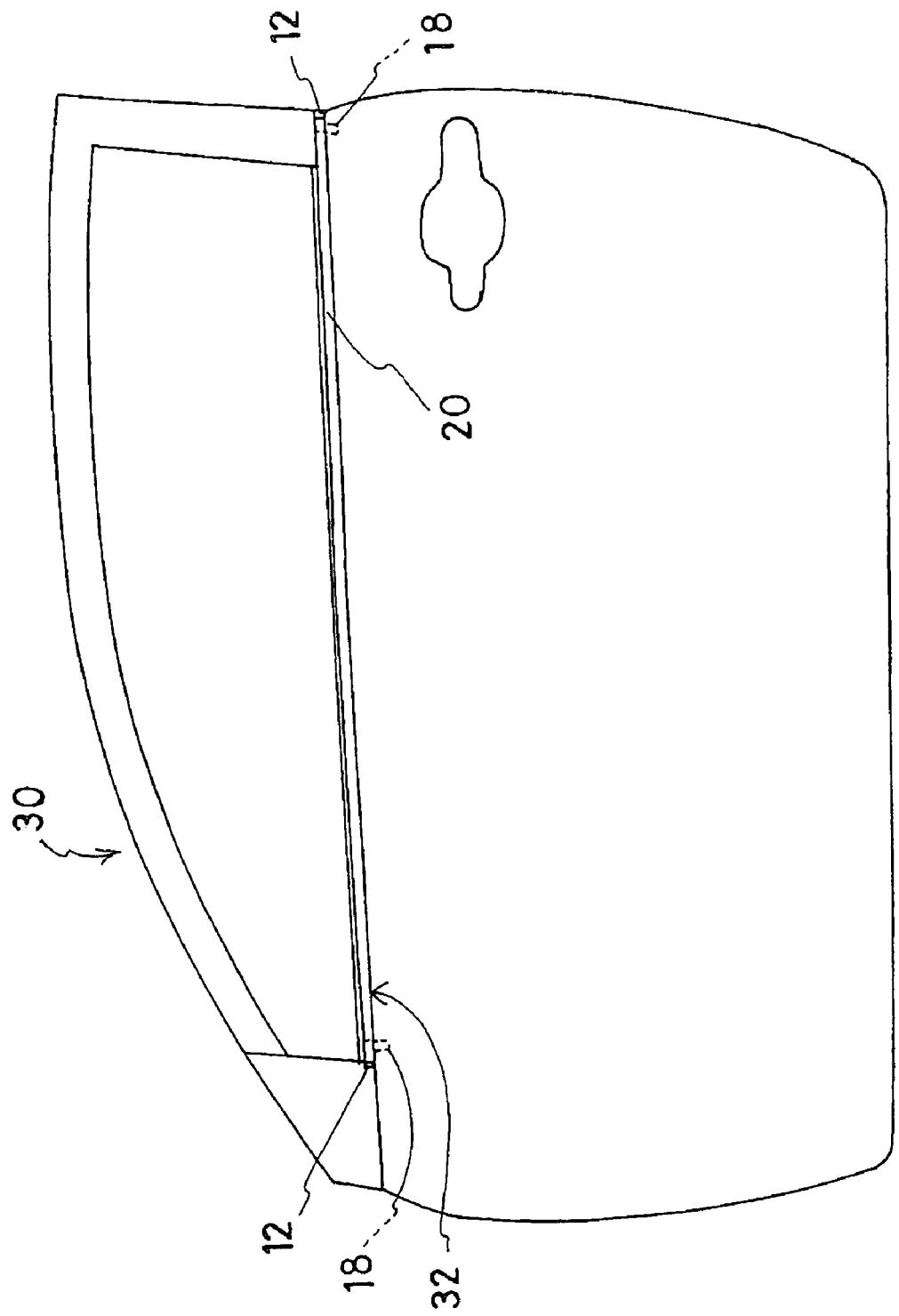
FIG. 5 is a side view of a door panel of a vehicle frame according to an embodiment of the present invention.

As the mould insert portion 14 of the mould end cap is inserted in the mould body 20, the hook portion 10 is engaged with the notch portion 24. At this time, the engagement part 18 provided at the distal end of the mould end cap protrudes perpendicularly to the lengthwise direction of the mould body 20. The mould body 20 to which the mould end cap has been assembled may be attached as a part of a weather strip 32 to a door panel 30 of a vehicle frame as shown in FIG. 5. At this time, the engagement part 18 of the mould end cap is engaged with a portion inside of the door panel 30 of the vehicle frame, so as to prevent the mould body with the mould end cap from being separated from the door panel 30 of the vehicle frame. Further, as shown in FIG. 1, because the engagement part 18 of the mould end cap is located adjacent to the hook portion 10, it is possible to reduce the entire length of the mould end cap and it is thus possible to reduce the manufacturing cost of the mould end cap.

Herein, as shown in FIGS. 6A, 6B and 6C, the engagement position between the notch portion 24 of the mould body 20 and the hook portion 10 of the mould end cap may have a small error according to the size or a positional deviation of the notch portion 24. Specifically, referring to FIG. 6A, the front end of the notch portion 24 is located at a position deviating backward from a predetermined position and the notch portion 24 has a size larger than a predetermined size. Then, the hook portion 10 is pushed outward by the elastic force of the leaf spring portion 16, so that the front surface 100a of the first step portion 100 or the front surface 101a of the second step portion 101 is engaged with the front end of the notch portion 24. This engagement can be accomplished even when the mould end cap has a hook portion 90 having a mountain-like shape as shown by a broken line in FIG. 6A, instead of the hook portion 10. Further, in the case shown in FIG. 6B, the notch portion 24 has a size smaller than the predetermined size. In this case also, the hook portion 10 is pushed outward in the way as described above, so that the front surface 100a and the rear surface 100b of the first step portion 100 or the front surface 101a and the rear surface 101b of the second step portion 101 are engaged with both ends of the notch portion 24. However, when the mould end cap has a hook portion 90 having a mountain-like shape as shown by a broken line in FIG. 6B, instead of the hook portion 10, it is impossible to engage the hook portion 90 with the notch portion 24. Further, in the case shown in FIG. 6C, the rear end of the notch portion 24 is located at a position deviating forward from a predetermined position. In this case, the hook portion 10 is pushed outward in the way as described above, so that only the rear surface 101b of the second step portion 101 is engaged with the rear end of the notch portion 24. However, when the mould end cap has a hook portion 90 having a mountain-like shape as shown by a broken line in FIG. 6C, instead of the hook portion 10, it is impossible to engage the hook portion 90 with the notch portion 24. As described above, when there is any deviation in the location or size of the notch portion 24 of the mould body 20, an error may occur in the position at which the hook portion 10 of the mould end cap is engaged with the notch portion 24 of the mould body 20. Even in this case, because of the front surface 100a or 101a or the rear surface 100b or 101b of the first step portion 100 or the second step portion 101, the hook portion 10 can be engaged with the notch portion 24 of the mould body 20. Therefore, it is possible to attach the mould end cap to the mould body 20 at a portion between those surfaces and the cap end portion 12. As a result, it is possible to automatically correct an error that may occur in the position at which the hook portion 10 of the mould end cap is engaged with the notch portion 24 of the mould body 20. Thus, it is possible to prevent a gap from easily generating between the cap end portion 12 of the mould end cap and the opening end of the mould body 20, thereby providing a desirable appearance when the mould end cap has been assembled with the mould body 20.

Therefore, a mould end cap according to an embodiment of the present invention can prevent generation of a gap between the mould end cap and the mould body 20 assembled with each other, and attain an intended design.

Further, even when the second step portion 101 has a quadrangular pyramidal shape, a mould end cap according to an embodiment of the present invention can achieve the same effect as described above.

The invention claimed is:

1. A mould end cap comprising:
   a cap end portion engaged with an end of a mould body for a vehicle frame;
   a mould insert portion extending from the cap end portion and inserted in the mould body; and
   a hook portion provided at the mould insert portion and engaged with the mould body,
   wherein the hook portion comprises:
   a first step portion having a quadrangular column shape, which has a front surface and a rear surface inclined and opposite to each other, and side surfaces each having a trapezoidal shape; and
   a second step portion located on an upper end of the first step portion, the second step portion having a quadrangular column or pyramid shape, which has an inclined front surface, a vertical rear surface, and side surfaces each having a trapezoidal or triangular shape.

2. The mould end cap as claimed in claim 1, wherein the front surface of the first step portion and the front surface of the second step portion compose a single continuous surface.

3. The mould end cap as claimed in claim 1, wherein the mould insert portion includes a leaf spring portion extending in an insertion direction toward the mould body, and the hook portion is formed at the leaf spring portion.

4. The mould end cap as claimed in claim 1, further comprising an engagement part extending in a direction perpendicular to the insertion direction toward the mould body and engaged with the vehicle frame, wherein the engagement part is located near the hook portion.

* * * * *